US006250672B1

United States Patent
Ryan et al.

(10) Patent No.: US 6,250,672 B1
(45) Date of Patent: Jun. 26, 2001

(54) VEHICLE AIRBAG RESTRAINT SYSTEM WITH DEACTIVATION INDICATOR

(75) Inventors: Sean Timothy Ryan, Farmington Hills; William Michael Abramczyk, Rochester Hills, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 28 days.

(21) Appl. No.: 09/641,737

(22) Filed: Aug. 18, 2000

(51) Int. Cl.[7] .................................................. B60R 21/32
(52) U.S. Cl. ............................................ 280/735; 180/268
(58) Field of Search ................................... 280/735, 734; 180/271, 282, 268; 701/45

(56) References Cited

U.S. PATENT DOCUMENTS

| | | |
|---|---|---|
| 5,174,600 * | 12/1992 | Jahn et al. ............................ 280/733 |
| 5,400,867 * | 3/1995 | Muller et al. ........................ 180/265 |
| 5,482,314 | 1/1996 | Corrado et al. . |
| 5,720,519 * | 2/1998 | Barnes ............................. 297/216.11 |
| 5,721,527 | 2/1998 | Simmons et al. . |
| 5,982,048 | 11/1999 | Fendt et al. . |
| 5,992,879 | 11/1999 | Bogge . |
| 5,992,880 | 11/1999 | Cuddihy . |
| 6,026,340 | 2/2000 | Corrado et al. . |

FOREIGN PATENT DOCUMENTS

| | | |
|---|---|---|
| WO 98/51547 | 11/1998 | (WO) . |
| WO 00/13945 | 3/2000 | (WO) . |

* cited by examiner

Primary Examiner—Paul N. Dickson
Assistant Examiner—Faye M. Fleming
(74) Attorney, Agent, or Firm—Gary A. Smith

(57) ABSTRACT

An inflatable passenger restraint system for use in an automotive vehicle having a passenger seat airbag and seat belt provides positive confirmation to the vehicle driver that the airbag is disabled when a light-weight child carrier seat is secured in the passenger seat using the seat belt. The system includes an occupant classification system such as a weight sensor and/or a non-contact occupancy sensor, and a seat belt buckle condition sensor for detecting whether the seat belt is fastened or unfastened. An airbag control module receives inputs from the occupant classification system and alternatively arms or disarms the passenger airbag in response thereto. An airbag condition indicator alerts the vehicle driver when the passenger seat airbag is disarmed because it is considered to be "unoccupied" and the seat belt is fastened. Accordingly, when an infant carrier seat is secured in the passenger seat using the seat belt, and the infant seat and infant having a total weight too low to provide a "seat occupied" input to the airbag control circuit, the airbag condition indicator provide the driver with positive confirmation that the airbag is disarmed.

20 Claims, 1 Drawing Sheet

VEHICLE AIRBAG RESTRAINT SYSTEM WITH DEACTIVATION INDICATOR

FIELD OF THE INVENTION

The present invention relates to automotive vehicle inflatable occupant restraint systems such as airbags. More particularly, it relates to such a restraint system having an automatic airbag disable system and an indicator for alerting the driver of the vehicle when the passenger seat airbag is disarmed.

BACKGROUND OF THE INVENTION

Since inflatable occupant restraint systems have come into widespread use in the automotive industry, it has been observed that there are certain instances in which it may be desirable to deactivate the airbag system, or a portion thereof. Exemplary of such an instance is that present when a rear-facing infant seat is placed in the front passenger position and is not properly positioned for use with the airbag. Another example is that of a driver who is small in stature and must operate a vehicle from a seating position that is very close to the steering wheel of the vehicle.

Airbag systems have been developed which include a manually actuated switch for deactivating the airbag for the passenger seat and/or driver seat positions. It is known to provide a visual indicator such as a lamp to indicate to occupants of the vehicle when one or both of the airbags are deactivated. See, for example, U.S. Pat. No. 5,992,880, the disclosure of which is incorporated herein by reference.

It is also known to provide an airbag system in which either airbag may be disabled automatically depending upon one or more inputs from sensors in the vehicle passenger compartment. For example, it is known to provide a weight sensor in the passenger seat and institute control logic which turns OFF or disables the passenger side airbag automatically when a weight below a certain threshold level is present in the passenger seat. The threshold weight level may be selected to constitute a cut-off line between a large-statured person, for whom normal airbag operation is considered appropriate, and a small statured person, for whom the airbag should be disabled. An indicator lamp is illuminated when the airbag is OFF to provide confirmation to the driver and the passenger of the fact that the airbag is disabled.

The above-described control logic may be further configured so that when the passenger seat weight sensor detects a weight below a second, lower threshold value (for example, 15 lbs.), the seat is considered to be completely unoccupied, as opposed to occupied by a small-statured person. In this case, the airbag is disabled because it is not needed, but the lamp is not illuminated because the driver does not require positive confirmation of the airbag being disabled. The lower threshold value is preferably not zero so that relatively light objects such as grocery bags, packages, purses, or the like may be set on the passenger seat without unnecessarily illuminating the "airbag off" lamp.

One possible shortcoming inherent in the above-described system may become apparent if a light-weight infant carrier seat containing a small infant is placed in the passenger seat and secured in place for travel. The total weight of the seat and infant will be less than the upper threshold, so that the airbag is disabled, as is appropriate. However the weight may also be below the lower threshold value so that the "airbag off" lamp is not illuminated, and hence the driver is not provided with any positive confirmation that the airbag is disabled.

It is also known to provide an airbag circuit which includes a sensor for determining the status of the seat belt buckle so that the operation of the airbag system may be adjusted depending on whether the occupant is belted or unbelted. See for example U.S. Pat. No. 5,982,048.

SUMMARY OF THE INVENTION

The present invention contemplates an inflatable passenger restraint system for use in an automotive vehicle having at least one passenger seat adapted to receive either an occupant in a normal sitting position or a child safety seat. The restraint system includes a passenger airbag in front of the passenger seat and a seat belt associated with the passenger seat for securing persons or a child safety seat position. An occupant classification system is operative to determine physical characteristics of the passenger seat occupant, such as size, weight and position. A seat belt sensor is operative to detect whether or not the seat belt is in a fastened condition. An airbag control circuit receives inputs from the occupant classification system and alternatively arms or disarms the passenger airbag in response thereto.

An airbag condition indicator is provided in the passenger compartment of the automobile and is operative to alert the vehicle driver when the passenger seat airbag is disarmed. In keeping with the prior art, the airbag condition indicator does not alert the driver if the occupant classification system indicates that the seat is not occupied by a person. According to the invention, the logic controlling activation of the airbag condition indicator takes into account whether the seat belt is fastened or unfastened and activates the indicator if the belt is fastened even if the seat otherwise appears to be unoccupied. Accordingly, if an infant carrier seat is secured in the passenger seat using the seat belt and the infant seat and infant do not have the proper size, weight, or other characteristics to cause the occupant classification system to send a "seat occupied" signal to the airbag control circuit, the airbag condition indicator provides the driver with positive confirmation that the airbag is disarmed.

DETAILED DESCRIPTION OF THE PREFERRED EMBODIMENT

Figure 1:
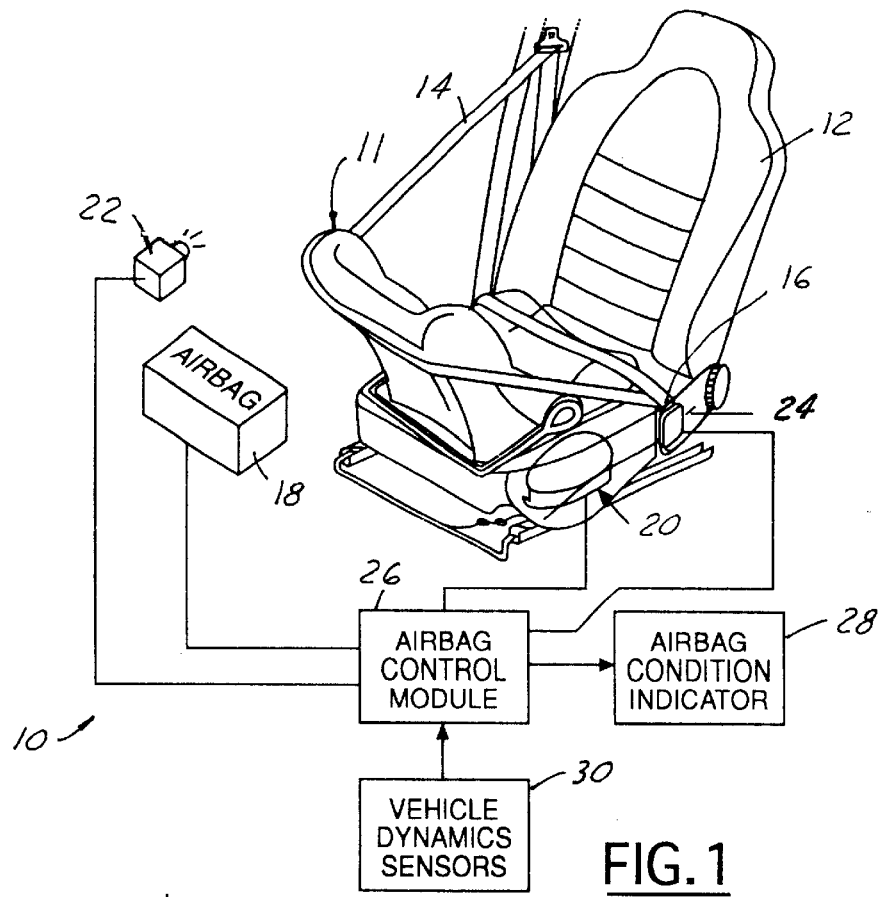
FIG. 1 is a schematic diagram showing the major components of an inflatable restraint system according to the present invention.

Referring to FIG. 1, an infant carrier seat 11 is shown secured in the passenger seat 12 of a vehicle by wrapping a seat belt 14 around the carrier seat 11 and fastening seat belt buckle 16. An inflatable occupant restraint system 10 according to an embodiment of the invention includes an airbag 18 of conventional construction positioned in front of seat 12; a weight sensor 20 disposed in or beneath the seat; an occupancy sensor 22 disposed adjacent the seat; a seat belt buckle condition sensor 24; an airbag control module 26; and an airbag condition indicator 28.

As is well known in the automotive restraint field, airbag 18 is typically positioned in or on the dashboard (not shown) directly ahead of seat 12 in an uninflated or nondeployed condition, and is inflated by pyrotechnic means or cold gas to protect an occupant of the seat during crash conditions. Weight sensor 20 may operate in any appropriate manner to detect the weight or mass of any object located on seat 12. Occupancy sensor 22 may be a sensor of any appropriate type, such as capacitive, ultrasonic, infrared, or optical, and is operative to detect physical characteristics such as the size and/or positioning of an object located in passenger seat 12. Occupancy sensor 22 may, for example, utilize pattern recognition means to allow identification of occupants of different sizes located in various positions in passenger seat 12. Occupancy sensor 22 may be positioned in, on, or adjacent seat 12 as required for proper functioning of the sensor.

Airbag condition indicator 28 may be, for example, a lamp providing a visual indication to occupants of the vehicle, or a chime, buzzer, or synthesized voice unit providing an audible indication. The following disclosure describes airbag condition indicator 28 as being a single-stage lamp that is illuminated when airbag 18 is not armed and is off when the airbag is armed. The invention, however, may also be practiced in conjunction with a dual-stage indicator, such as a lamp, which provides positive indications of both airbag disarmed and airbag armed conditions. Buckle condition sensor 24 may be of any appropriate type, such as a mechanical switch or a Hall effect sensor, as well known in the seat belt art.

Airbag control module 26 is preferably a microprocessor-based device and is electrically connected with weight sensor 20, occupancy sensor 22, buckle condition sensor 24, airbag 18, airbag condition indicator 28, and other systems such as vehicle dynamics sensors 30.

When restraint system 10 is activated, airbag control module 26 receives signals from an occupant classification system, which in the described embodiment of the invention consists of weight sensor 20 and occupancy sensor 22. Airbag control module 26 uses either or both of these inputs to determine whether or not passenger seat 12 is occupied by a person and, if so, whether the person occupying the seat is large in stature or weight so that the airbag 18 should be armed, or small in stature or weight so that the airbag 18 should be disarmed. For simplicity, the following description will refer to the occupancy determination as being made based only on a signal from weight sensor 20. It is to be understood, however, that the determination can be made utilizing any type of sensor or sensors appropriate for use in an occupant classification system without departing from the scope of the invention.

Figure 2:
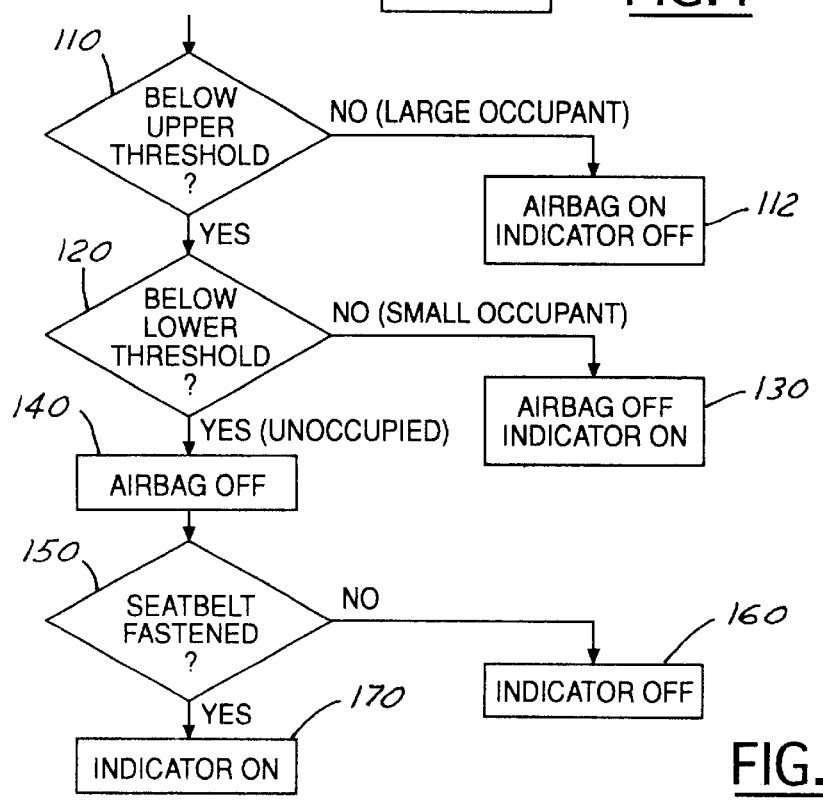
FIG. 2 is a flow diagram showing the logic performed by the airbag control circuit.

An algorithm for making the occupancy determination is illustrated in the flow chart of FIG. 2. At block 110, the input signal from weight sensor 20 is compared with an upper threshold weight. The upper threshold value is selected to determine the cutoff between a large-statured seat occupant for whom airbag 18 should be armed or ON, and a small-statured occupant for whom the airbag should be disarmed or OFF. The upper threshold value may not remain constant during all operating modes of the vehicle, but rather may vary depending upon factors such as vehicle velocity, crash severity, and other considerations as determined by inputs from vehicle dynamics sensors 30. If the weight of the seat occupant is not below the upper threshold, the occupant is classified as "large" and airbag 18 is turned ON and airbag condition indicator 28 is turned OFF, as indicated at blocks 112 and 114.

If the sensed weight is below the upper threshold, the airbag control logic progresses to block 120, where the weight is compared to a lower threshold value. The lower threshold value is to allow objects to be carried on passenger seat 12 without arming airbag 18 unnecessarily. The lower threshold may be, for example, approximately 15 pounds. If the sensed weight of an occupant is not below the lower threshold, the occupant is classified as "small," and airbag 18 is turned OFF, as indicated at block 130, and indicator 28 is turned ON, as indicated at block 132, to provide vehicle occupants with a positive confirmation that the airbag is off. If the sensed weight is below the lower threshold value, seat 12 is considered to be "unoccupied" by a person and airbag 18 is turned OFF, as shown at block 140.

The airbag control logic next steps to block 150, where an input signal from seat belt buckle condition sensor 24 is received and evaluated. If seat belt buckle 16 is not fastened, indicator 28 remains OFF (block 160) because, as passenger seat 12 holds no person that may be injured by an undesired inflation of airbag 18, it is not important that the driver receive positive confirmation that the airbag is switched OFF.

If, however, airbag control module 26 receives a signal from seat belt buckle condition sensor 24 indicating that seat belt buckle 16 is fastened, this may indicate that seat belt 14 is being used to secure an infant carrier seat 11 in passenger seat 12. In this case, indicator 28 is switched ON (block 170), thereby providing a positive confirmation to the driver that airbag 18 is indeed turned OFF, as is desired in most cases when a child carrier seat 11 is present.

As stated above, the description of the algorithm as relying on a signal from weight sensor 20 to make the occupancy determination is for illustrative purposes only. It is to be understood that the occupancy determination can be made based on any sensor or combination of sensors that detect the presence, position, and/or physical characteristics of objects located in or on the seat 12.

Various other modifications and variations will no doubt occur to those skilled in the arts to which this invention pertains. Such variations and modifications, which generally rely on the teachings through which this disclosure has advanced the art, are properly considered within the scope of this invention. This disclosure should thus be considered illustrative, not limiting; the scope of the invention is instead defined by the following claims.

What is claimed is:

1. An inflatable occupant restraint system for an automotive vehicle having at least one passenger seat, the system comprising:

a passenger airbag;

a passenger seat belt;

a seat belt sensor operative to detect whether the seat belt is fastened or unfastened;

an occupant classification system operative to determine at least one physical characteristic of an occupant of the passenger seat;

an airbag control circuit operative to alternatively arm or disarm the airbag in response, at least in part, to an input from the occupant classification system; and an airbag condition indicator operative to alert a driver of the vehicle when the passenger airbag is disarmed and the seat belt is fastened.

2. The inflatable occupant restraint system of claim 1, wherein the occupant classification system comprises a mass sensor.

3. The inflatable occupant restraint system of claim 2, wherein the airbag control system is operative to disarm the airbag when the mass sensor indicates that the seat occupant has a mass below a threshold value.

4. The inflatable occupant restraint system of claim 1, wherein the occupant classification system comprises a non-contact sensor.

5. The inflatable occupant restraint system of claim 4, wherein the non-contact sensor comprises an infrared sensor.

6. The inflatable occupant restraint system of claim 4, wherein the non-contact sensor comprises an ultrasonic sensor.

7. The inflatable occupant restraint system of claim 4, wherein the non-contact sensor comprises an optical sensor.

8. The inflatable occupant restraint system of claim 4, wherein the non-contact sensor comprises an capacitive sensor.

9. The inflatable occupant restraint system of claim 1, wherein the seat belt comprises a buckle having mating first and second portions and the seat belt sensor detects whether the first and second portions are mated or unmated.

10. The inflatable occupant restraint system of claim 1, wherein the airbag control circuit disarms the airbag when the occupant classification system indicates that the passenger seat is unoccupied.

11. The inflatable occupant restraint system of claim 1, wherein the airbag condition indicator provides a visual indication.

12. The inflatable occupant restraint system of claim 1, wherein the airbag condition indicator provides an audible indication.

13. An inflatable occupant restraint system for an automotive vehicle having at least one passenger seat, the system comprising:
    a passenger airbag;
    a passenger seat belt;
    a seat belt sensor operative to detect whether the seat belt is fastened or unfastened;
    an occupant classification system operative to determine at least one physical characteristic of an occupant of the passenger seat;
    an airbag control circuit operative to alternatively arm or disarm the airbag in response, at least in part, to an input from the occupant classification system; and
    an airbag condition indicator activatable to alert a driver of the vehicle when the passenger airbag is disarmed, activation of the indicator being controlled, at least in part, by an input from the seat belt sensor.

14. The inflatable occupant restraint system of claim 13, wherein the occupant classification system comprises a mass sensor.

15. The inflatable occupant restraint system of claim 13, wherein the airbag control system is operative to disarm the airbag when the mass sensor that the seat occupant has a mass below a threshold value.

16. The inflatable occupant restraint system of claim 13, wherein the occupant classification system comprises a non-contact sensor.

17. The inflatable occupant restraint system of claim 13, wherein the seat belt comprises a buckle having mating first and second portions and the seat belt sensor detects whether the first and second portions are mated or unmated.

18. The inflatable occupant restraint system of claim 13, wherein the airbag control circuit disarms the airbag when the occupant classification system indicates that the passenger seat is unoccupied.

19. The inflatable occupant restraint system of claim 13, wherein the airbag condition indicator provides a visual indication.

20. An inflatable occupant restraint system for an automotive vehicle having at least one passenger seat, the system comprising:
    a passenger airbag;
    a passenger seat belt having first and second buckle portions engageable with one another;
    a buckle sensor operative to detect whether the first and second buckle portions are engaged or disengaged;
    a seat occupancy sensor operative to determine whether the passenger seat is occupied or unoccupied;
    an airbag control circuit operative to alternatively arm or disarm the airbag in response to at least an input from the seat occupancy sensor; and
    an airbag condition indicator operative to alert a driver of the vehicle when the passenger airbag is disarmed and the buckle sensor indicates that the first and second buckle portions are engaged.

* * * * *